(12) United States Patent
Goldsmid et al.

(10) Patent No.: US 8,271,803 B2
(45) Date of Patent: Sep. 18, 2012

(54) ANTI-DEBUGGING PROTECTION OF BINARIES WITH PROXY CODE EXECUTION

(75) Inventors: Aaron Payne Goldsmid, Seattle, WA (US); Nir Ben-Zvi, Redmond, WA (US); Sekhar P. Chintalapati, Issaquah, WA (US); Karan Singh Dhillon, Renton, WA (US); Nathan Ide, Bothell, WA (US); David John Linsley, Seattle, WA (US); Ping Xie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/754,024

(22) Filed: May 25, 2007

(65) Prior Publication Data

US 2007/0234430 A1 Oct. 4, 2007

Related U.S. Application Data

(63) Continuation-in-part of application No. 10/681,017, filed on Oct. 8, 2003.

(51) Int. Cl.
G06F 21/00 (2006.01)
(52) U.S. Cl. ...................................... 713/190
(58) Field of Classification Search .................. 713/190
See application file for complete search history.

(56) References Cited

U.S. PATENT DOCUMENTS

| 6,006,328 A | 12/1999 | Drake | 713/200 |
| 6,094,730 A * | 7/2000 | Lopez et al. | 714/28 |
| 6,845,908 B2 | 1/2005 | Morita et al. | |
| 6,933,919 B1 | 8/2005 | Anderson et al. | |
| 2002/0005834 A1 | 1/2002 | Oh | |
| 2003/0093685 A1 | 5/2003 | Tobin | 713/200 |
| 2003/0112220 A1 | 6/2003 | Yang et al. | |
| 2004/0181772 A1 | 9/2004 | Pensak et al. | 717/100 |
| 2005/0114683 A1 | 5/2005 | Jin et al. | 713/187 |
| 2005/0183072 A1 | 8/2005 | Horning et al. | 717/140 |
| 2006/0005251 A1 | 1/2006 | Wu et al. | 726/26 |
| 2006/0069653 A1 | 3/2006 | Lelikov et al. | 705/59 |

(Continued)

FOREIGN PATENT DOCUMENTS

WO WO 2006/085103 A1 8/2006

OTHER PUBLICATIONS

Tulloch, M., "Windows 2000 Administration in a Nutshell", Feb. 16, 2001, O'Reilly Media, 4 pages.

(Continued)

*Primary Examiner* — Kim Vu
*Assistant Examiner* — John B King
(74) *Attorney, Agent, or Firm* — Woodcock Washburn LLP

(57) ABSTRACT

A first process operating on a computer comprises code to be executed in connection therewith, where the code includes at least one triggering device. A digital license corresponds to the first process and sets forth terms and conditions for operating the first process. A second process operating on the computer proxy-executes code corresponding to each triggering device of the first process on behalf of such first process. The second process includes a selection of options to thwart reverse engineering by a debugger if a debugger is detected. The options include execution by a proxy engine of a re-routed call, crashing the first process, detection ad elimination of a debugger related interrupt a call to an arbitrary function.

20 Claims, 7 Drawing Sheets

U.S. PATENT DOCUMENTS

2006/0109262 A1 5/2006 Yeh
2006/0195906 A1 8/2006 Jin et al. ............... 726/26

OTHER PUBLICATIONS

Using USB Flash Drives at SUNY/Cortland Instructions for Windows XP/2000, Dec. 12, 2004, Academic Computing Liaisons, 8 pages.

Cappaert, J. et al., "Self-Encrypting Code to Protect Against Analysis and Tampering", http://www.cosic.esat.kuleuven.be, 14 pages.
Griffiths, A., "Binary Protection Schemes", http://www.secure-software-engineering.com, Revision 1.0-prerelease-0.6, 91 pages.
Main, A. et al., "Software Protection and Application Security: Understanding the Battleground", *State of the Art and Evolution of Computer Security and Industrial Cryptography*, Jun. 2003, 19 pages, http://www.scs.carleton.ca.

* cited by examiner

ANTI-DEBUGGING PROTECTION OF BINARIES WITH PROXY CODE EXECUTION

CROSS REFERENCE TO RELATED APPLICATIONS

The present application is a continuation-in-part of U.S. application Ser. No. 10/681,017, filed Oct. 8, 2003, entitled "First Computer process and second Computer Process Proxy-executing Code on Behalf Thereof," which is incorporated herein by reference in its entirety.

BACKGROUND

A computer application distributor wishes to distribute such computer application to each of many users or recipients in exchange for a license fee or some other consideration. However, such distributor typically also wishes to restrict what each user or recipient can do with such distributed computer application. For example, the distributor would like to restrict the user from copying and re-distributing such application to a second user, at least in a manner that denies the distributor a license fee from such second user.

In addition, the distributor may wish to provide the user with the flexibility to purchase different types of use licenses at different license fees, while at the same time holding the user to the terms of whatever type of license is in fact purchased. For example, the distributor may wish to allow the application to be executed only a limited number of times, only for a certain total time, only on a certain type of machine, only on a certain type of rendering platform, only by a certain type of user, etc. Likewise, the distributor may wish to allow one user to pay a smaller license fee and access a smaller set of application functions and also to allow another user to pay a larger license fee and access a larger set of application functions, and the like.

However, after distribution has occurred, such distributor has very little if any control over the distributed application. This is especially problematic in view of the fact that the application may be copied and re-distributed to most any personal computer, presuming that the application is not otherwise protected in some manner from such copying and re-distribution. As should be appreciated, most any such personal computer includes the software and hardware necessary to make an exact digital copy of such application, and to download such exact digital copy to a write-able magnetic or optical disk, or to send such exact digital copy over a network such as the Internet to any destination.

Of course, as part of a transaction wherein the application is distributed, the distributor may require the user/recipient of the application to promise not to re-distribute such application in an unwelcome manner. However, such a promise is easily made and easily broken. A distributor may therefore attempt to prevent such re-distribution through any of several known security measures.

One such security measure is product activation. In such product activation, a customer acquiring a software application is provided with a product activation key corresponding thereto, which is a unique serial number and product identifier that acts as a proof of purchase or the like. The provided product key is then entered during installation of the application on a particular computer device to act as a proffer that the application was acquired legally and/or otherwise properly. The product activation key need not be and typically is not cryptographic in nature, although a digital signature (which is cryptographic in nature) may be included to act as a guarantee that the product key is genuine.

The entered product key and an ID representative of the computer device are then sent to a product activation service as part of the installation process. As may be appreciated, the product activation service determines whether the entered product key is valid, whether the product key has been employed before, and if so in connection with what computer device. Typically, each product key enables an installation or re-installation of the application on a single computing device, as is set forth in a corresponding license agreement, although a product key may also enable a set number of installations/re-installations on multiple computer devices also.

Accordingly, if the product activation service determines that the entered product key has already been employed to install the application on another computer device (or has been employed a maximum number of times, for example), such activation service will not allow the installation of the application on the computer device to proceed, will not allow a complete installation of the application on the computer device, will not allow the installed application to be used on the computer device, or the like, as the case maybe. Thus, activation as used herein may entail permission to install the application, permission to perform some level of installation of the application, permission to completely install the application, some level of permission to use the application, complete permission to use the application, or the like.

If the activation service declines to activate the application for the customer based on an entered product key already being used in connection with another computing device, or based on the entered product key not supporting the level of activation desired, the customer must acquire another appropriate product key to install/completely install/use the application on the computing device in the manner desired. Thus, the product key and the product activation service act to ensure that the application is not nefariously or wantonly installed/activated/used on multiple computing devices, such as may be in violation of any software license agreement associated with the software product.

Note that as part of the activation process, the activation service may return a digital version of the license to the computing device on which the application is associated. Such license may be tied to the computing device such that the license is not usable with any other computing device, and may express a level of activation, as well as license terms such as application functions that are to be made available, functions that are to be made non-available, a period of activation or a number of times the application may be executed on the computing device, and the like. In general, such license may express any limitations and/or rights and also may express any policies that should be honored in connection with the execution of the application on the computing device, all as set forth by the distributor of the application or another entity.

With such license, then, a rights client controller with a license evaluator or the like may be employed on the computer along with the distributed application to control operation and use of the application based on an evaluation of whether the license so permits. However, a need exists for an actual method and mechanism by which such rights client with such license evaluator may in fact control operation and use of the application based on the license. In particular, a need exists for such a rights client with such a license evaluator that executes certain portions of code on behalf of and as a proxy for the application, but only if the license evaluator determines that the license allows such execution.

Another threat to the security of a binary object is unauthorized reverse engineering. It is well known that a debugger is crucial to the successful reverse engineering of an executable binary. The ability to prevent debugging is a critical part of a successful protection strategy of an IP sensitive binary. While many anti-debugging techniques have been implemented in the past they typically rely on two approaches. The first is by leveraging all of the various programmatic interfaces provided by the operating system to detect a debugger. The second is by sprinkling these queries throughout the binary. This approach was limited by the fact that attackers could defeat this by either shimming the OS interfaces to return compromised results or find and remove the "sprinkled" checks from the binary. The combination of these techniques only slows down the use of debuggers and does not stop a debugging process.

SUMMARY

The aforementioned needs are satisfied at least in part by the present invention in which a computer has thereon a first process operating on the computer comprising code to be executed in connection therewith, where the code includes at least one triggering device, and a digital license corresponding to the first process, where the license sets forth terms and conditions for operating the first process. A second process operating on the computer proxy-executes code corresponding to each triggering device of the first process on behalf of such first process. The second process includes a license evaluator for evaluating the license to determine whether the first process is to be operated in accordance with the terms and conditions set forth in such license, and the second process chooses whether to in fact proxy-execute the code corresponding to each triggering device of the first process on behalf of such first process based at least in part on whether the license evaluator has determined that the first process is to be operated in accordance with the terms and conditions of the license. Thus, the first process is dependent upon the second process for operation thereof.

The second process monitors for when the first process executes a triggering device thereof. Upon such occurrence, the second process responds thereto by determining an address of the triggering device within the first process, locating in a table the code section corresponding to the triggering device based on the determined address, and proxy-executing the located code section on behalf of the first process.

To develop the first process, source code is developed in an appropriate programming language, and within such source code each of one or more code sections that is to be proxy-executed by the second process is identified. The source code is compiled into machine code such that an identification of each identified code section is maintained, and the machine code is post-compiled with each identified code section therein into final code representative of the first process based on the identification of each identified code section by for each identified code section converting same into a form accessible only by the second process and not by the first process.

In one embodiment, the proxy process is used to detect and provide anti-debugger techniques to avoid reverse engineering. The proxy engine selects from one or more options that thwart reverse engineering attempts after a debugger is detected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION

Exemplary Embodiments

Computer Environment

Figure 1:
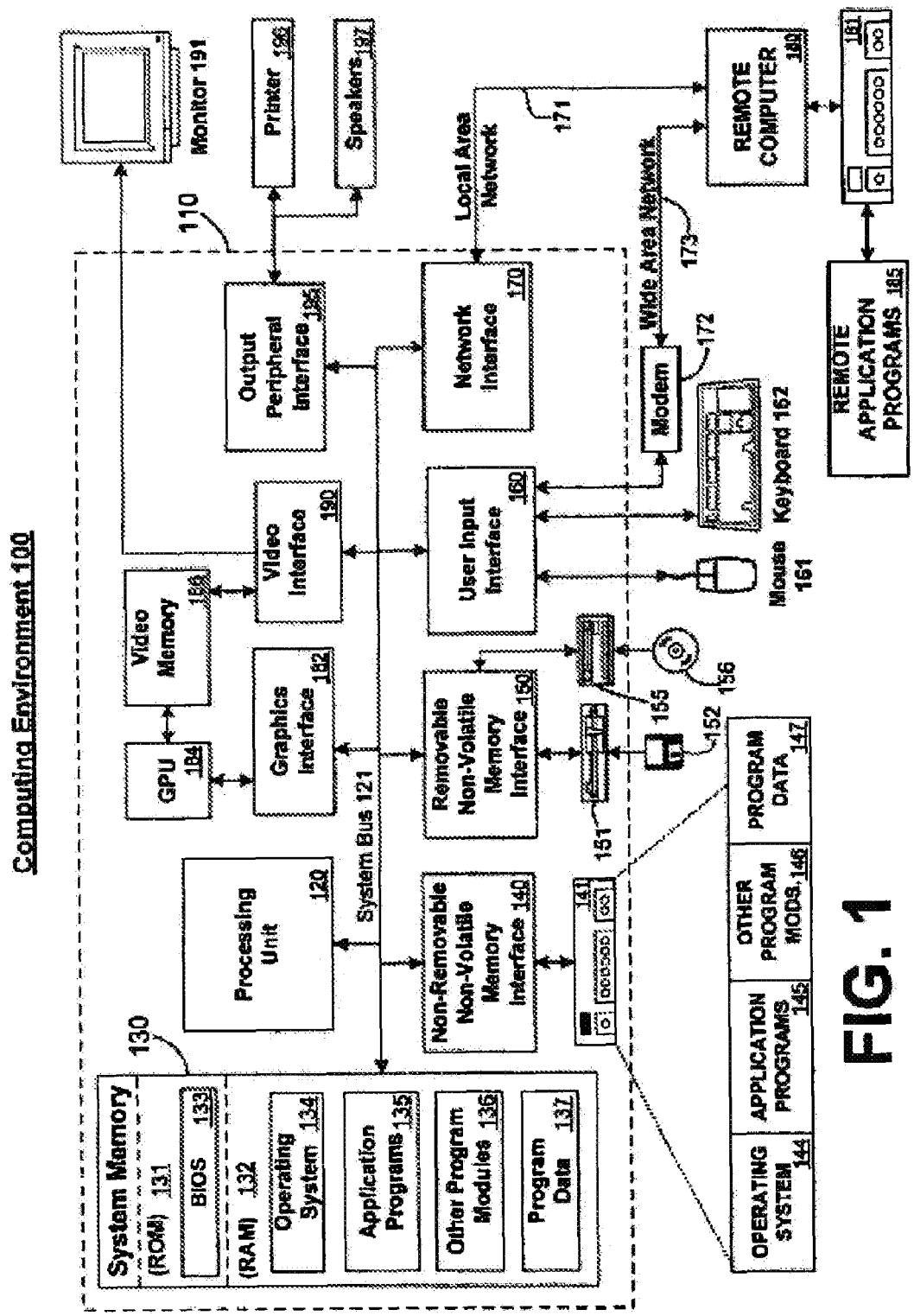
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of non-transitory computer readable media including any available media that can be accessed by computer 110 and including both volatile and nonvolatile media, removable and non-removable media. By way of example, and not limitation, computer readable media may comprise computer storage media including nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by computer 110. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
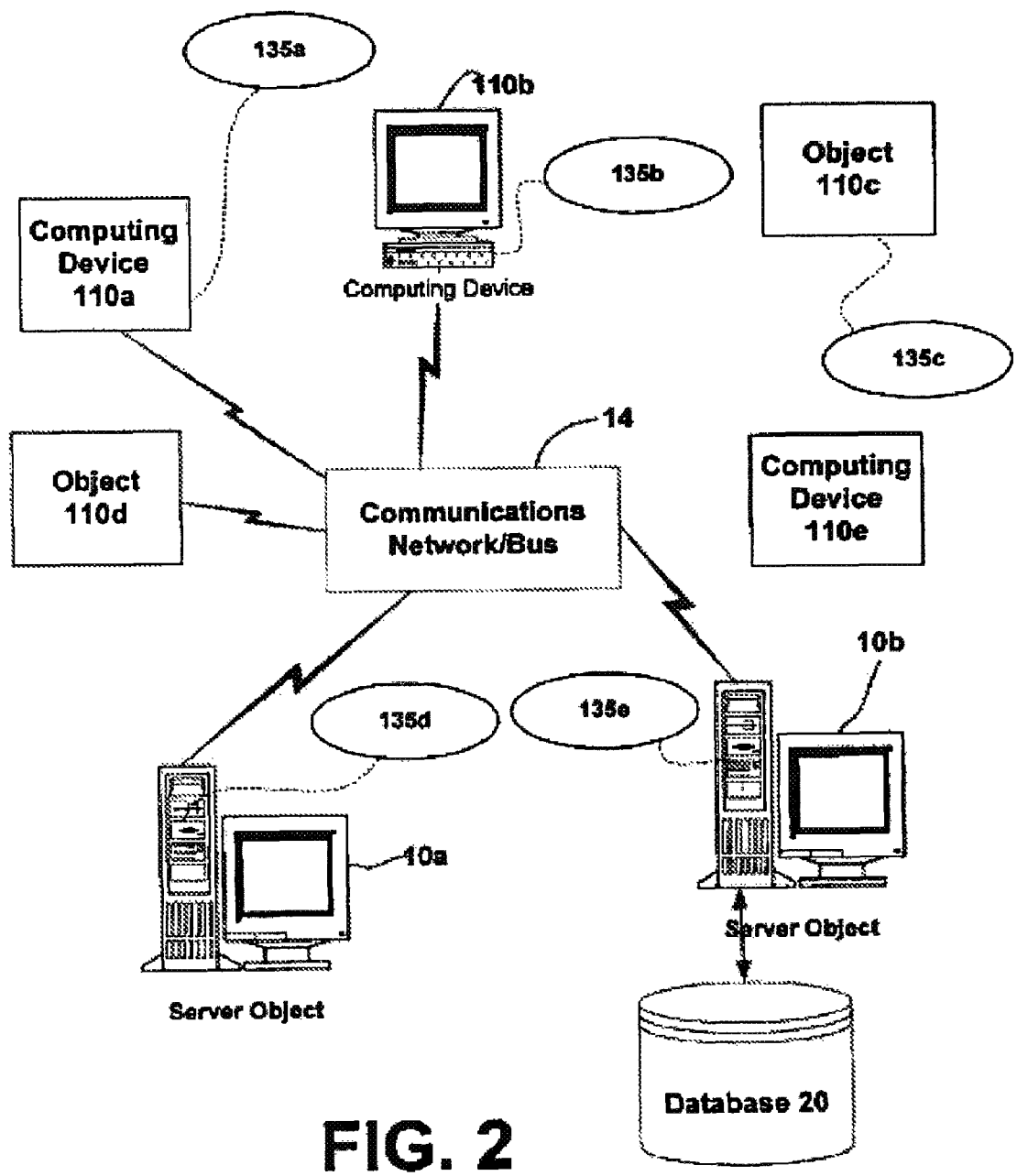
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 10c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Proxy Execution of Code

In the present invention, a rights client with a license evaluator and in connection with a product activation service controls operation and use of an application based on a corresponding license by executing code on behalf of and as a proxy for an application, but only if the license evaluator determines that the license allows such execution. Thus, the rights client with the license evaluator enforces the license as against a user of the application.

As may be appreciated, although the present invention is disclosed primarily in terms of the rights client with the license evaluator, the application, the license, and the product activation service, such present invention may also be employed in connection with alternate elements without departing from the spirit and scope of the present invention. For example, the application may instead be any application or type of process running on a computer, including a program, an operating system, and the like, or even a piece of digital content such as an audio recording or multimedia presentation. Similarly, the license may instead be any sort of permission token, with or without specific permission parameters, and the license evaluator may instead be any kind of device for evaluating such a permission token. Likewise, the product activation service may instead be any variety of permission-granting authority, and the rights client may instead be any variety of controlling authority that can also proxy-execute code. Accordingly, and more generally, in the present invention, a second process on a computer controls the operation and use of a first process on a computer by executing code on behalf of and as a proxy for the first process.

Figure 3:
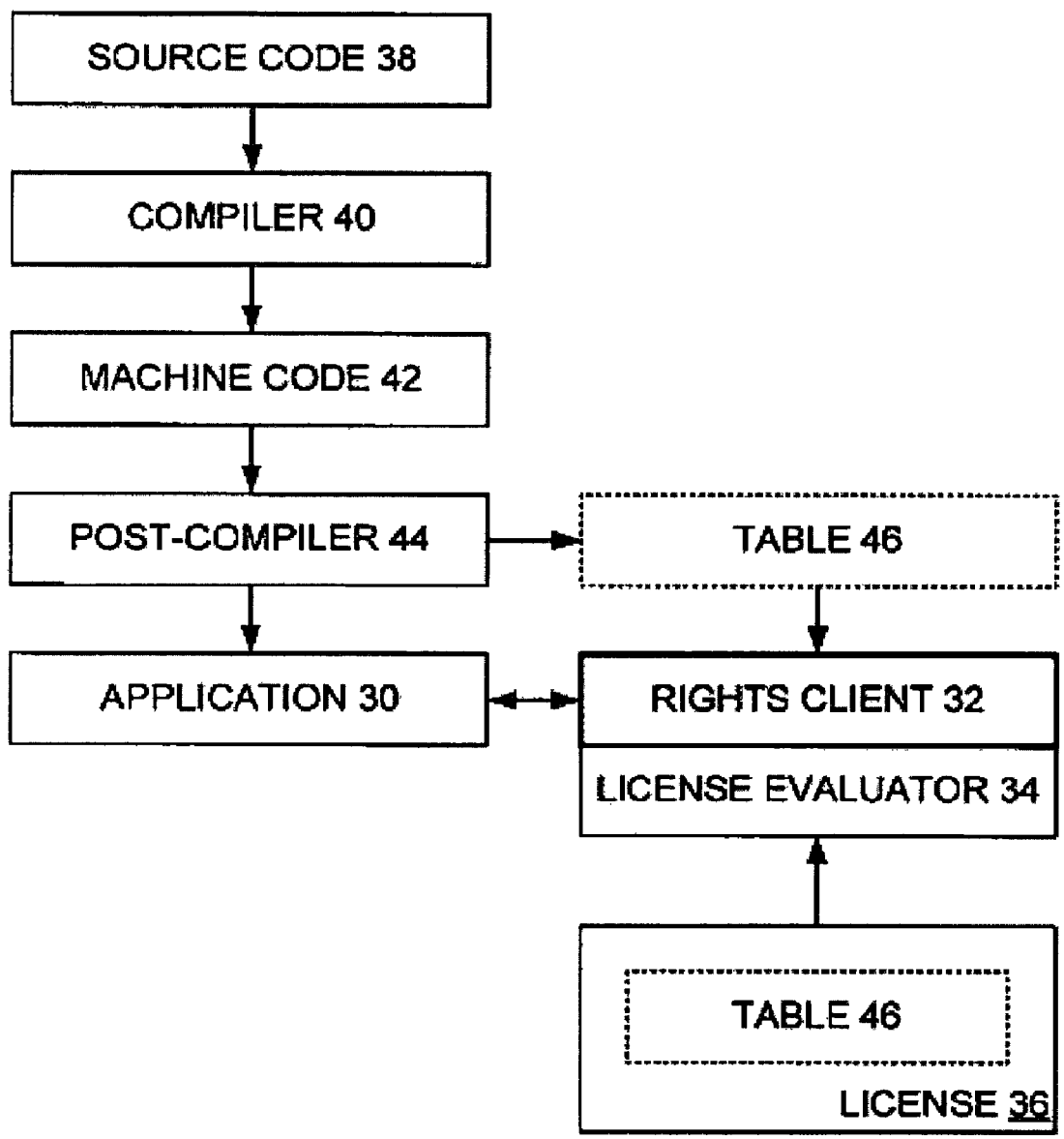
FIG. 3 is a block diagram showing a first computer process, a second computer process proxy-executing code on behalf of the computer process, and related elements in accordance with one embodiment of the present invention.

Turning now to FIG. 3, it is seen that in one embodiment of the present invention, a first process such as an application 30 is dependent upon a second process such as a rights client 32 to proxy execute at least some portion of code for the application 30, where the rights client 32 includes a license evaluator 34 or the like. Accordingly, the rights client 32 may choose whether to in fact proxy execute the code for the application 30 based, among other things, on whether the license evaluator 34 has access to a license 36 corresponding to the application 30, and on whether the license 36 has permissions or rights that allow or at least do not prohibit the action corresponding to the code to be executed. Note that such a license 36 and the license evaluation 34 of the rights client 32 are known or should be apparent to the relevant public and therefore need not be disclosed herein in any detail.

Figure 4:
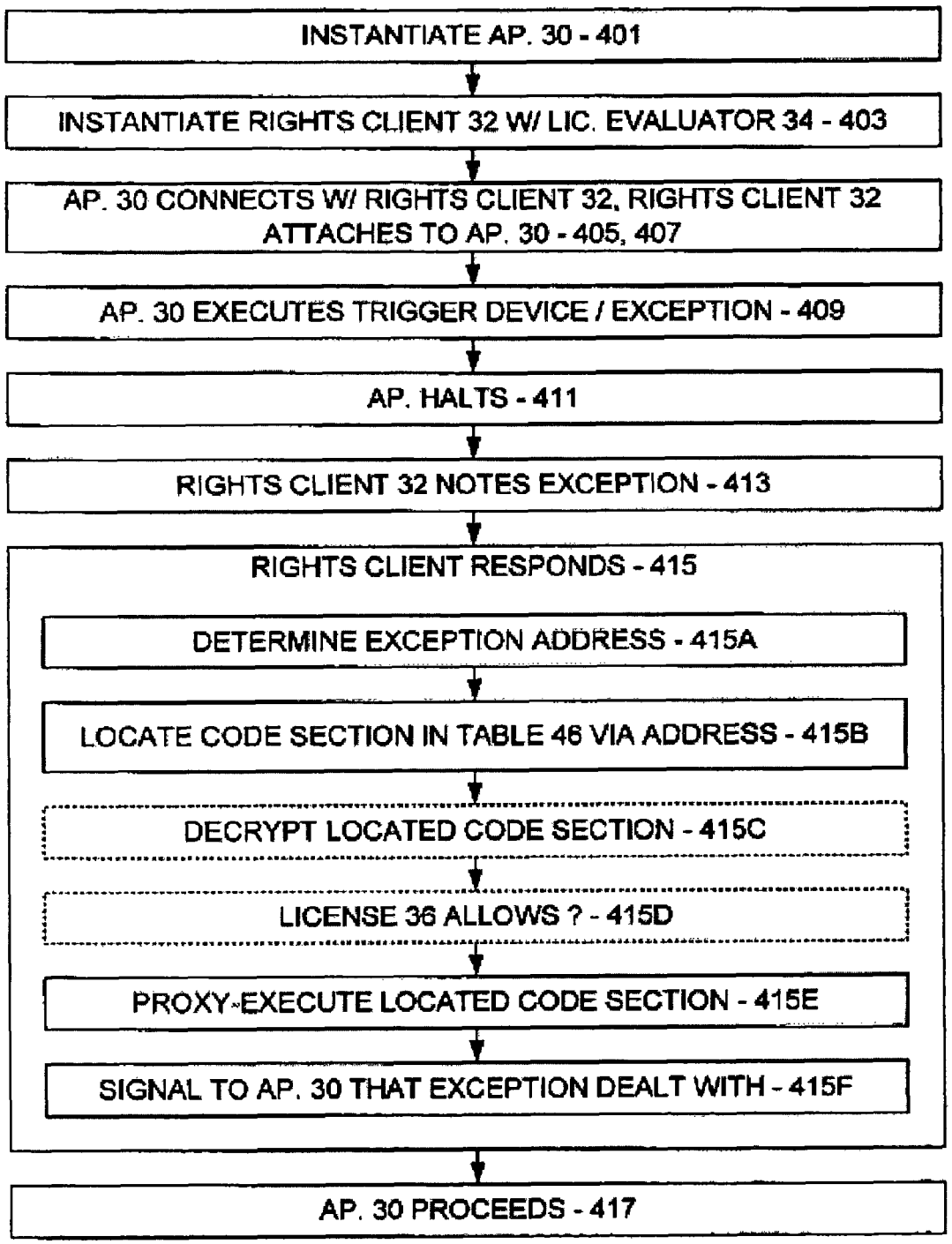
FIG. 4 is a flow diagram showing key steps performed in connection with the first and second processes of FIG. 3 to proxy-execute code in accordance with one embodiment of the present invention.

In one embodiment of the present invention, and referring now to FIG. 4, the application 30, rights client 32, and license evaluator 34 are constructed to operate on a computer 110 (FIG. 1) or the like as follows. Typically, either a user or another process on the computer 110 instantiates the application 30 on such computer 110 as the aforementioned first process (step 401), and as part of an initializing process such application 30 ensures that the rights client 32 with the license evaluator 34 (hereinafter, 'rights client 32') is instantiated on the computer 110 as the aforementioned second process (step 403). Thereafter, the application 30 establishes a connection with the rights client 32 (step 405). Note that it may be the case that the rights client 32 is already instantiated or it may be the case the rights client 32 must be newly instantiated, either by the application 30, another process, the user, or the like.

Once step 405 is performed, and presuming that a license 36 corresponding to the application 390 is available to the rights client 32 and the license evaluator 34 thereof, the application 30 can query the rights client 32 to have the license evaluator 34 thereof determine based on the license 36 the rights the application 30 has based on such license 36, and the application 36 can then operate based on such rights. However, it is to be appreciated that a nefarious entity wishing to subvert the license 36 might choose to attack the application 30 by re-directing the query to a stub rights client that would in effect grant all rights to the application 30 without regard to any license 36, present or otherwise. Alternatively, such a nefarious entity might choose to spoof communications between the application 30 and the rights client 32 or may wish to attack the rights client 32 itself if the application 30 cannot be attacked. Note, though, that the latter case is less likely inasmuch as the rights client 32 should be highly secure and protected from such an attack.

Accordingly, and in one embodiment of the present invention, the rights client 32 is required to proxy-execute at least some portions of code on behalf of the application 30 so that the application is dependent on the rights client 32. Put another way, by requiring the rights client 32 to proxy-execute at least some portion of code on behalf of the application 30, the aforementioned nefarious entity cannot subvert the license 36 by somehow removing the rights client 32 from participating in the method of FIG. 4. Instead, the rights client 32 must participate to proxy-execute code on behalf of the application 30, and while doing so the license evaluator 34 of the rights client 32 can also perform evaluation functions with regard to the license 36. Thus the rights client 32 does not merely provide the application 30 with a true or false type of response that could be spoofed.

In one embodiment of the present invention, the license 36 includes encoded information regarding the code that the rights client 32 is to proxy-execute. Thus, the license 36 must be available to the rights client 32 for same to proxy-execute on behalf of the application 30. For example, the encoded information may include the code, a reference to a location of the code, a decryption key for decrypting an encrypted version of the code, or the like.

Figure 5:
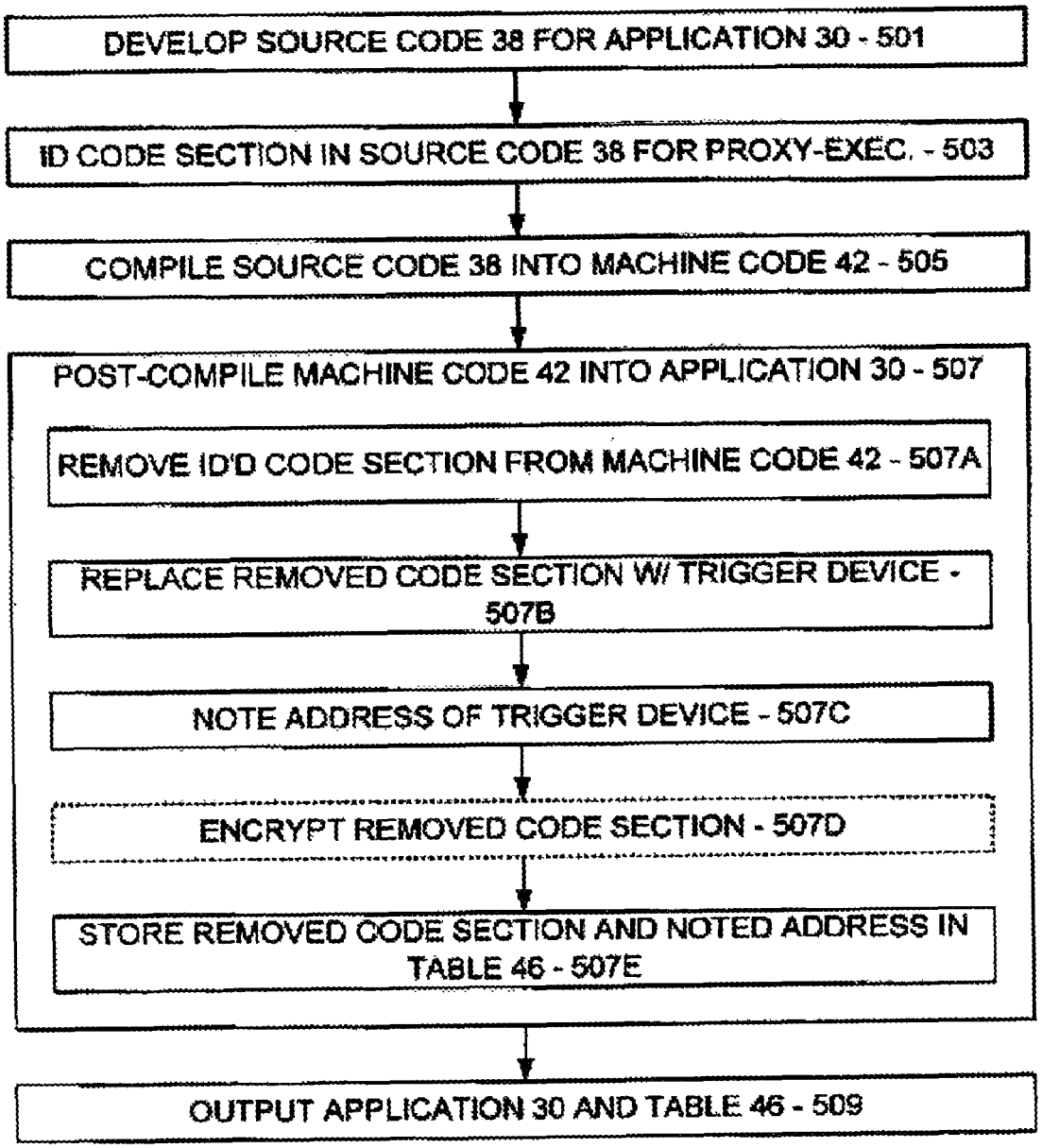
FIG. 5 is a flow diagram showing key steps performed to develop the first process of FIG. 3 in accordance with one embodiment of the present invention.

As should now be appreciated, in order to effectuate proxy-execution, the application 30 must be pre-processed to define the code that is to be proxy-executed, to remove same from such application 30, and to appropriately store such removed code in a form proxy-executable by the rights client 32. In one embodiment of the present invention, then, and turning now to FIG. 5, a method of pre-processing the application 30 to effectuate proxy-execution is shown.

Preliminarily, and as may be appreciated, a developer develops source code 38 (FIG. 3) for the application 30 in an appropriate programming language, such as for example a C-type programming language (step 501). In doing so, and significantly, the developer identifies within such source code 38 for the application 30 each of one or more code sections that is to be proxy-executed (step 503). As may be appreciated, each such proxy-executed code section identification may comprise any appropriate mark, tag, command, or the like without departing from the spirit and scope of the present invention. Thereafter, the developer compiles the source code 38 with a compiler 40 into machine code 42 (step 505).

Note that the developer may identify each code section within the source code 38 based on any particular criteria without departing from the spirit and scope of the present invention. For example, if the developer merely wishes to trigger proxy-execution from time to time so as to ensure the rights client 32 is present and is allowing the application 30 to operate based on a corresponding license 36, each such identified code section may be decided upon in a fairly random manner. However, if the developer wishes to trigger proxy-execution at specific times and/or with regard to specific sections of code, each such identified code section must be decided upon in a more targeted manner. Note with regard to the latter that it may be the case that an identified code section specifies a particular license right. In such a situation, it may also be the case that the rights client 32 will proxy-execute such identified code section only if the specified license right in the license 36 is met.

As may be appreciated, the compiler 40 may be any appropriate compiler without departing from the spirit and scope of the present invention. Significantly, the compiler 40 is constructed to maintain each code section identification in the machine code 42 so that post-compile processing may be performed on the code section identified thereby. Such maintaining maybe performed in any appropriate manner without departing from the spirit and scope of the present invention. For example, the compiler 40 may pass the identification from the source code 38 to the machine code 42 in a recognizable form, or may create a scratch table (not shown) with such information therein.

Thus, and in one embodiment of the present invention, after such compiling, the developer post-compiles the machine code 42 with each recognizable code section identification therein with a post-compiler 44 into the final code representative of the application 30, where the post-compiler 44 converts each identified code section into a form accessible only by the rights client 32 and not by the application 30, such as for example by removing each identified code section in the machine code 42 from such application 30 or otherwise makes such identified code section inaccessible (step 507). As may be appreciated, such post-compiler 44 is constructed to retrieve each code section identification, either from the machine code 42, the aforementioned scratch table, or elsewhere, and operate based thereon.

In one embodiment of the present invention, for each identified code section in the machine code 42, the post-compiler 44 removes the identified code section from the machine code 42 (step 507a), replaces the removed code section with a triggering device (step 507b), notes an address of the triggering device within the application 30 (step 507c), and stores the removed code section and the noted address in a table 46 (FIG. 3) or the like (step 507e). If necessary or advisable, each removed code section may stored in the table 46 in an encrypted form decryptable by the rights client 32 (step 507d). As was set forth above, such table 46 may be made available to the rights client 32 by being set forth in the license 36, or by being set forth in another location. Note that the table 46 may be signed or otherwise protected from alteration by a verifying device such as a hash.

As may be appreciated, by replacing the removed code section with the triggering device, and presuming that the triggering device is shorter than the removed code section, the post-compiler 44 shortens the machine code 42. Note that the triggering device may be any appropriate triggering device without departing from the spirit and scope of the present invention, as long as the triggering device is recognizable as a signal that the rights client 32 is needed to proxy-execute the corresponding removed code section. For example the triggering device may be a particular exception that would get the attention of the rights client 32.

After the post-compiler 44 is finished, and as should now be appreciated, such post-compiler 44 outputs final code representative of the application 30 (hereinafter, 'the application 30') and the table 46 (step 509). As was set forth above, such table 46 may be made available to the rights client 32 by being set forth in the license 36, or by being set forth in another location separate from the application 30. It may for example be the case that the table 46 with encrypted removed code sections therein is placed in the license 36 along with a decryption key for decrypting each encrypted code section, where the decryption key is itself encrypted in a manner decryptable by the rights client 32. Note that by separating the table 46 from the application 30, the application 30 has no innate access to the table 46 or the removed code sections therein.

Thus, and returning now to FIG. 4, during runtime, and after the application 30 and rights client 32 have been instantiated, the rights client 32 attaches itself to the application 30 in the manner of a debugger or the like so that the rights client 32 can monitor the application 30 for when each triggering device/exception therein is executed (step 407). As may be appreciated, the rights client 32 monitors the application 30 for the particular triggering device/exception (hereinafter, 'exception') that signals that the rights client 32 is to proxy-execute on behalf of the application 30. Thus, on every breakpoint exception, the rights client 32 determines whether the exception source is a removed code section, and if so the rights client proxy-executes the removed code section, presuming the license 36 so allows.

In an alternate embodiment of the present invention, the rights client 32 does not attach itself to the application 30 to monitor for an exception, but instead receives the exception from an operating system operating the computer 110. However, such an arrangement is indirect and therefore slower. Another alternative would be to have each triggering device be a call to the rights client 32, although such a strategy is slightly more complex as compared to an exception and is more prone to attack by a nefarious entity.

At some point, the application 30 may explicitly request permission to operate from the rights client 32 based on the license 36. In response, the rights client 32 searches for the license 36, the license evaluator 34 evaluates such license 36, and the rights client 32 returns such requested permission if the evaluation of the license evaluator 34 is positive. Note, though, that such explicit request for permission and response are ancillary to the present invention. Rather, in the present invention, the rights client 32 is actuated based on an exception or the like from the application 30 and not based on an explicit request from the application 30. Thus, in the present invention, the rights client 32 can withhold performance of a function on behalf of the application 30 even when the application 30 never requested permission to perform such function.

At any rate, in the course of operating, the application 30 at some point executes an exception in the code thereof, where such exception was placed in the application 30 by the post-compiler 44 in place of a removed identified code portion (step 409). As should be understood, upon executing the exception, the application 30 halts until receiving notice that the exception has been dealt with (step 411). Inasmuch as the rights client 32 is attached to the operating application 30 and is listening for such exception from such application 30, such rights client 32 notes the exception (step 413) and responds thereto (step 415).

In particular, to respond to the exception, the rights client first determines the address of the exception within the application 30 (step 415*a*), locates the corresponding code section in the table 46 based on such address (step 415*b*), proxy-executes such corresponding code section on behalf of the application (step 415*e*), and then signals to the application 30 that the exception has been dealt with (step 415*f*). As may be appreciated, the application 30 may then proceed (step 417). Note that if the corresponding code section is encrypted, the rights client 32 must decrypt the located corresponding code section before proxy-executing same (step 415*c*). Note, too, that a particular code section may require that the license evaluator 34 of the rights client 32 first verify that the license 36 grants the rights necessary to proxy-execute such code section on behalf of the application 30 (step 415*d*). As may be appreciated, the rights client 32 proxy-executes such code section only if the license grants the right to do so. Otherwise, the rights client 32 declines to do so. In the latter case, it may be that the rights client 32 returns an appropriate message to the application 30.

It is to be appreciated that a rights client 32 should not be proxy-executing any arbitrary code section, especially inasmuch as the rights client 32 should be especially secure and therefore could have a relatively large amount of operating rights with respect to the computer 110. Put another way, the rights client 32 should not be performing actions that the application would not have operating rights to perform, such as altering certain system registers, accessing memory areas of other applications and the operating system, and the like. Accordingly, in one embodiment of the present invention, the post-compiler 44 during operation thereof ensures that each code section removed and stored thereby is not of a sensitive nature. For example, it may be the case that the post-compiler 44 during operation thereof ensures that each such code section does not affect system memory. Of course, other bases for filtering code sections may be employed without departing from the spirit and scope of the present invention. Note that if a code section includes sensitive code, it may be that the post-compiler isolates such sensitive code and removes only sub-portions of code on either side of the sensitive code.

In one embodiment of the present invention, the rights client 32 proxy-executes on behalf of the application only if a valid license 36 corresponding to such application 30 is available to the rights client 32. In such a case, it may be that the purpose of each exception and proxy-execution based thereon is merely to occasionally check that the license 36 is still present and still valid. In an alternate embodiment, the rights client 32 proxy-executes on behalf of the application without regard to any corresponding valid license 36. In such a case, it may be that the purpose of each exception and proxy-execution based thereon is merely to tie the application 30 to the rights client 32, which presumably is tied to the computer 110, thus tying the application 30 to the computer 110.

In one embodiment of the present invention, the application 30 as produced by the post-compiler 44 may include multiple types of exceptions, each triggering the rights client 32. However, each different type of exception is handled differently. For one example, one type of exception may require the rights client 32 to check the license 36 while another type may not. For another example, different types of exceptions could require access to different tables 46, or could require different decryption keys and/or methods.

As disclosed herein, the application 30, the rights client 32, and the license 36 are separate constructs. Nevertheless, it should be appreciated that such items may be combined in any manner without departing from the spirit and scope of the present invention. For example, the application 30 could include the rights client 32, or the rights client 32 could include the license 36. Note, though, that in at least some instances combined items may be more susceptible to an attack from a nefarious entity.

As also disclosed herein, the rights client 32 proxy-executes code on behalf of the application 30. Alternatively, the rights client 32 may operate to modify the application 30 to include the to-be-executed code, allow such application to execute such code, and then again modify the application 30 to remove such code. Note, though, that such an arrangement may be more susceptible to attack by a nefarious entity, especially in the moments when the application 30 is modified to include the to-be-executed code.

As may be appreciated, one especially useful aspect of the present invention is that the rights client 32 may now perform especially secure functions on behalf of the application 30 such that a nefarious entity is thwarted from affecting such functions. For example, it may be the case that a term in a license 36 affects how many times the application 30 can perform a specific action. Although the application 30 could obtain such term from such license 36, having the application 30 do so could allow a nefarious entity to intervene in the process to subvert same. Instead, in one embodiment of the present invention, the rights client 32 is employed to proxy-execute code for the application 30 relating to such term in such license 36, including obtaining the term and employing same.

Anti-Debugging Approaches

As mentioned above, one threat to an executable binary is the use of a debugger to reverse engineer the binary. The current proxy-execution technique may be used in conjunction with other methods to thwart the efforts to reverse engineer a binary.

Figure 6:
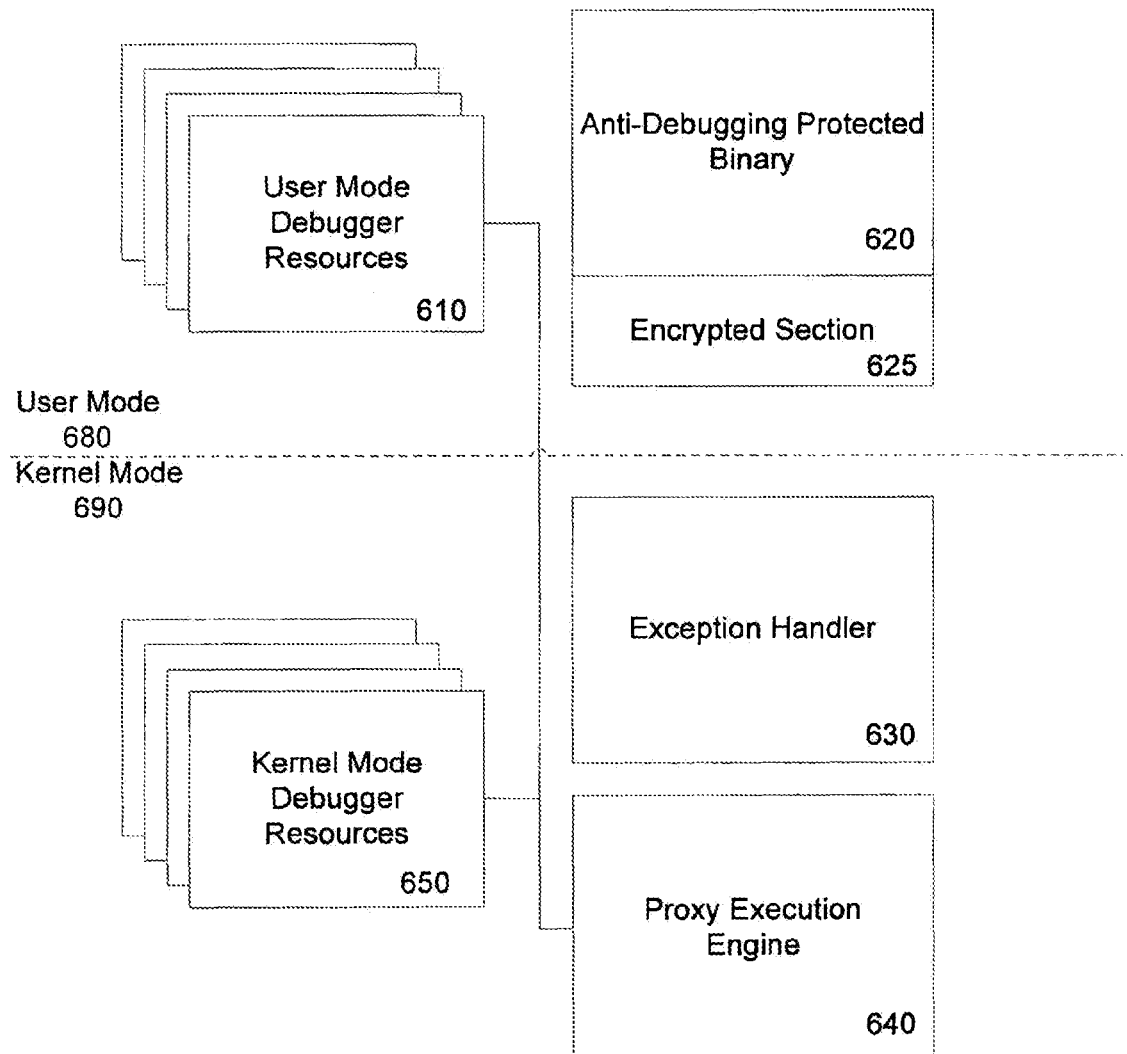
FIG. 6 depicts functional elements contributing to an implementation of a proxy execution scheme involving detection of a debugger.

FIG. 6 depicts a system of resources 600 used in accordance with the current invention to thwart the use of a debugger. In FIG. 6, a user mode 680 set of resources and a kernel mode 690 set of resources are shown. One of skill in the art will understand that the user mode and kernel mode resources include computing elements such as a processor, memory, I/O, display, and other items as shown in FIG. 1. An anti-debugging protected binary object 620 is shown associated with the user mode resources 680. The anti-debugging binary has a portion 625 that contains a portion of code removed from the main binary and targeted for proxy-execution according to aspects of the invention discussed above. This removed portion 625 may be optionally encrypted.

During execution of the anti-debugging protected binary 620, an exception may be generated which calls into action the exception handler 630. The execution handler 630, along with the proxy execution engine 640, employs resources such as user mode debugging resources 610 and kernel mode debugger resources 650 to check for the presence of an active debugger. If no debugger is detected, the proxy execution engine 640 executes the removed code section 625. It does this by decrypting the encrypted section 625 if necessary and processing the code sequence that is indicated as being part of the main binary 620. After the proxy execution by the engine 640, the exception handler 630 informs the anti-debugging protected binary 620 that the exception was properly dispatched and the execution of the anti-debugging binary 620 may proceed.

However, if the exception handler 630 detects the presence of a debugger, then execution of the proper code in section 625 does not take place. Here, the presence of a debugger modifies the expected execution of section 625 by the proxy engine 640. According to an aspect of the invention, during runtime, the removed sections 625 can only be executed by the proxy execution engine 640 when the presence of a debugger debugging the protected code is not detected.

Detection of a debugger may be accomplished many ways. In one method, the presence of a debugger is detected by the utilization of commonly employed debugger registers in either the user mode debugger resources 610 or by the kernel mode debugger resources. Another method to detect a debugger is the detection of the use of a communication port that is commonly used by debuggers. Another method to detect the presence of a debugger is the use of a specific interrupt (i.e. <INT3>) and determining that a debugger is requesting system resources. Yet another technique for detecting the use of a debugger is to identify vectored exceptions and handlers that are operating outside of the software process. Vectored exceptions of this character may indicate that a debugger is present. Other techniques for debugger detection may be used as is known by those of skill in the art. Once a debugger is detected, then the proxy engine has options on how to respond. In implementation, the selection of debugger resources to query are those that are also required for the debugger to function. This selection was made in order to prevent the attacker from falsifying this data.

The proxy engine 640 is in a unique situation that makes it ideal for hosting anti-debugging techniques. In one aspect, the proxy engine 640 design can cause unexpected errors in the process when a debugger is attached. In another aspect of the response of a debugger, the proxy engine 640 can cause the anti-debugging protected binary 620 to execute an alternate code path. One aspect of this response is that the alternate code path is invisible to the debugger. Accordingly, the debugger is unaware of the change in code path. The debugger is unaware because the choice of code path is performed in the kernel 690 and not the application binary 620 or the debugger itself. This may be termed call re-routing because the call to execute the appropriate functional portion of code in section 625 is changed. The changed or re-routed call can be a call to a dummy function which essentially leads the debugger/observer to either non-functional or a false result. Using this re-routing response, the logical functionality of the binary may be twisted because calling any incorrect function will mislead the debugger and cause the expected functionality of the protected binary 620 to be adversely disturbed. In implementation, the addresses of both the real and the dummy functions are contained within the encrypted section 625, making it difficult for the attacker to extract this call flow. During execution the proxy engine 640 will call the appropriate function based on the presence of a debugger.

Another proxy execution engine 640 response to the presence of a debugger is to crash the process. Essentially, this option, if taken by the proxy engine 640 would permanently stop the execution of the anti-debugging protected binary 620 and thus prevent any debugger from performing reverse engineering on the protected binary 620. In implementation, when anti-debugging protected code 620 executes and the exception is handled, the proxy engine 640 queries some system information to detect the existence of a debugger. If there is a debugger attached then instead of the proxy engine executing the proper instruction, it will execute the dummy code and pass back the context. This will cause the process of the protected binary to exhibit unexpected behavior and will eventually crash the process in such a way that it is difficult to directly determine that proxy engine 640 was the cause of the crash. If no debugger is attached, execution will continue as normal. The crash results in an unexpected end to the protected process being performed by the binary.

Yet another response to the presence of a debugger is that the proxy engine 640 can filter out any software breakpoints it handles. Thus, for example, if an interrupt, such as the <INT3> interrupt or other equivalent break is detected, the proxy can simply negate the interrupt and ignore the debugger request. It should be noted that all of these protections leverage the same core functionality. In all cases, the binary 620 is instrumented in the same way as with a traditional proxy as explained herein, except that it contains meta-data for the anti-debugging settings. In implementation, the proxy engine 640, due to its integration with the memory manager, can filter any software breakpoints added to the binary 620 prior to those breakpoints reaching first chance exception handlers. Filtering those debugger breakpoints out frustrates the purpose of the debugger.

Figure 7:
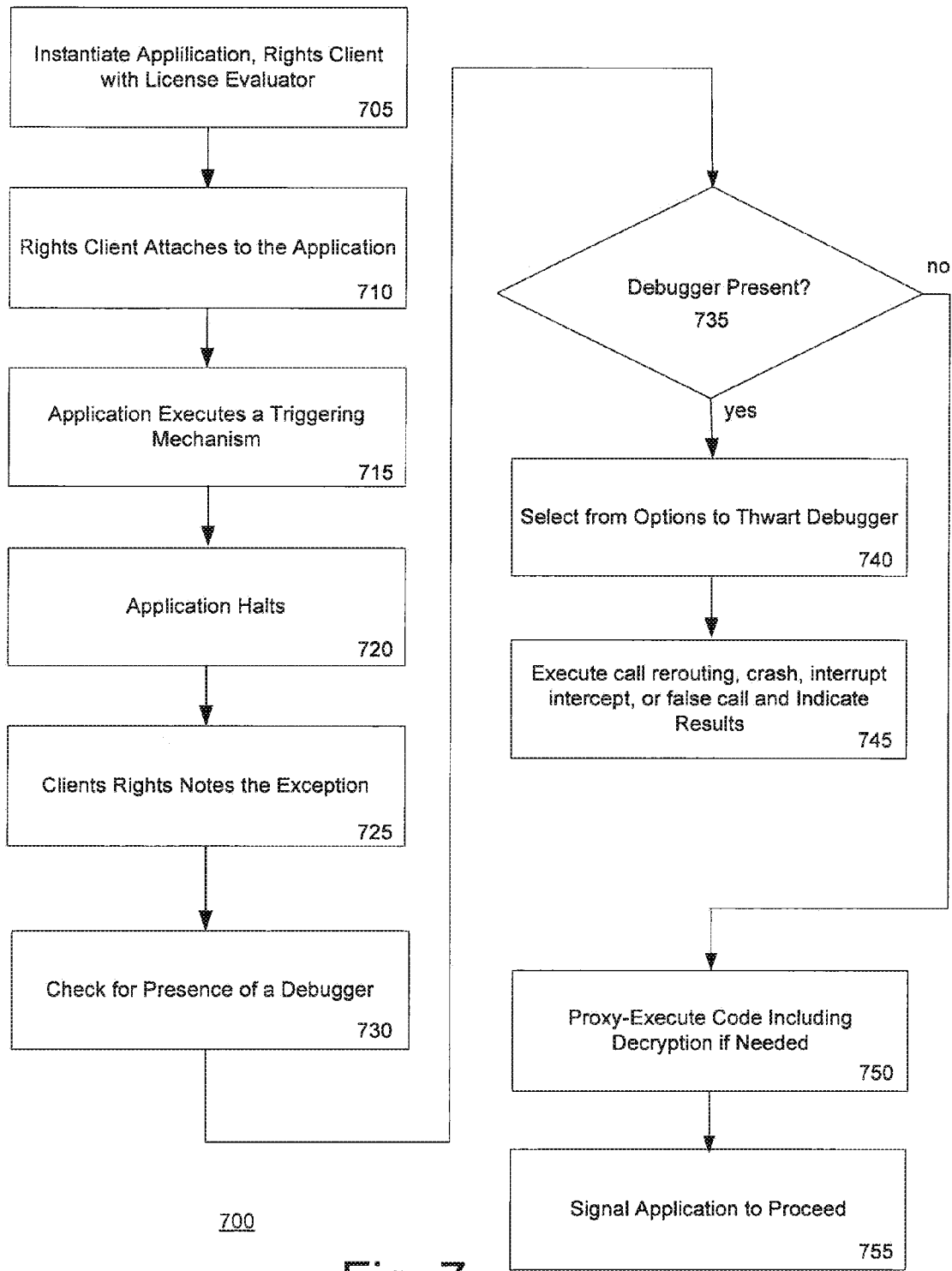
FIG. 7 depicts a flow diagram showing steps performed to detect and thwart reverse engineering on a protected binary according to aspects of the invention.

FIG. 7 depicts a method 700 to detect and respond to the presence of a debugger in a system that incorporates proxy code execution. Initially, when a developer has code that requires anti-debugging protection, he selects the sensitive code paths and instruments them with an obfuscation tool in a process described herein. This obfuscation tool replaces assembly instructions in the sensitive code paths with software exceptions, which are the same as the debugger interrupts. The original instructions are then encrypted and appended to the executable binary in an encrypted section. Once instrumented as such, these code paths will not be able to execute as part of the binary without the proxy engine in the kernel emulating these separated instruction on behalf of the application.

Step 705 in FIG. 7 indicates that the application with the separated code (such as in FIG. 6, items 620 and 625), a rights client and a license evaluator are instantiated. The rights client attaches to the application in step 710. The application executes a triggering mechanism in step 715. the triggering mechanism typically being an interrupt, a breakpoint, or the like. As a result, the application halts in step 720, and the rights client notices the exception in step 725. Steps 705 through 725 are similar to steps 401 through 413 of FIG. 4.

Returning to FIG. 7, the rights client, using a proxy engine, checks for the presence of a debugger in step 730 by analyzing user mode and kernel mode debugger resources, the use of interrupts, the use of debugger communication ports and the like. Based on the analysis, a decision is made as to the presence of a debugger in step 735. If no debugger is present, the proxy execution engine executes the section of code associated with the exception at step 750. If the section of code to be executed by the proxy engine is encrypted, then the engine first decrypts the code and processes the relevant code section. After processing is completed, a signal is sent to the application at step 755 that the exception was handled fully and that the application may proceed. It is noted that steps 750-755 are similar to steps 415A-415F of FIG. 4 where a license, if present is checked to verify that the terms of the license are met before the proxy engine executes that relevant portion of code.

If, at decision 735, it is determined that a debugger is present, then the method 700 takes step 740 and selects from a list of options designed to thwart the debugger. For instance, one option, as discussed above is to select to re-route a call statement so that the process 700 will eventually execute a dummy function. This selection may eventually lead to an address call to an "incorrect" section of code that leads the application to an undesired direction when the proxy engine eventually executes the dummy function. Another option is to select to crash the application binary. Another selection can be to intercept the interrupt or other breakpoint. Another selection may be to call any arbitrary function and redirect the application to that function At step 745, the selection made at step 740 is executed. This involves performing the selected anti-debugging operation such that reverse engineering of the application binary is prevented. As a result, the would-be recipient of the reverse engineering information is misled or otherwise stopped from gaining knowledge of the functionality of the protected application binary. In some instances, as will be appreciated by those in the art, a perception that the application binary is misbehaved may be present. In other instances, it may be invisible to the would-be recipient of the reverse engineering information that the proxy execution engine has misled the application binary. In either instance reverse engineering of the application binary is tangibly avoided. An operator of the debugger will likely observe that reverse engineering of the application binary has been halted or is incomplete. For example, the result of an application crash is observable as a stalled application. The result of a re-routed exception call is an unexpected operation that may be visible on a display. The result of an intercepted interrupt is a failure of the debugger to halt the application. These results are tangible evidence that the anti-debugging protection if the application binary is working.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided by which a rights client 32 with a license evaluator 34 control operation and use of an application 30 based on a license 36 corresponding thereto. The rights client 32 with the license evaluator 34 executes certain portions of code on behalf of and as a proxy for the application 30, where the license evaluator 34 can determine if the license 36 allows such execution.

In the present invention, a method and mechanism to detect the presence of a debugger utilizes a proxy execution engine. If a debugger is not present, execution of an application binary proceeds as previously described. If a debugger is present, then several options may be undertaken by the proxy engine to circumvent the possibility of reverse engineering the application binary. Each option relies on a pre-established protected binary having code segments which are executed by a proxy engine.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A computer-implemented method for proxy-execution of code to prevent reverse engineering of protected software of an application, the method comprising:

instantiating the protected software, wherein the protected software comprises a protected binary code and an encrypted section of code specifying a corresponding license right, wherein upon a determination that the encrypted section of code is within a set of operating rights of the application, the encrypted section of code is removed from the protected binary code and stored in a table, the encrypted section of code having computer instructions necessary for execution of the protected binary, and wherein the removed encrypted section of code is replaced with one or more calls to execute relevant portions of the computer instructions of the encrypted section of code using a proxy execution engine;

executing the protected binary code in accordance with a digital license until a call to the proxy execution engine generates an exception and halts execution of the protected software;

determining to execute the encrypted section of code, using the proxy execution engine, when a license evaluator verifies that the digital license grants the corresponding license right;

checking for the presence of a debugger before starting execution of the encrypted section of code;

upon detecting the debugger, selecting a response to detection of the debugger from one of the group including re-routing execution of the encrypted section of code, crashing the protected software, and intercepting an interrupt associated with the exception; and executing the selected response to detection of the debugger, wherein operation of the debugger to reverse engineer the protected software is prevented.

2. The method of claim 1, wherein checking for the presence of a debugger comprises examining debugger registers in debugger resources associated with a kernel and determining if the debugger registers are being utilized.

3. The method of claim 1, wherein checking for the presence of a debugger comprises detecting if a debugger communication port is active.

4. The method of claim 1, wherein checking for the presence of a debugger comprises performing one of the group including detection of a debugger interrupt requesting system resources and detection of vectored exceptions occurring externally to the protected software.

5. The method of claim 1, further comprising:
if the selected response is re-routing execution of the encrypted section of code, then the proxy execution engine transfers control to a dummy function.

6. The method of claim 5, wherein an address of the dummy function is present in the encrypted section of code.

7. The method of claim 1, further comprising:
if the selected response is intercepting an interrupt associated with the exception, then the intercepted interrupt is ignored by the debugger.

8. The method of claim 1, further comprising:
if the selected response is crashing the protected software, the result comprises an unexpected end of a process performed by the protected software.

9. A computer system for proxy-execution of code for applying an anti-debugging protection mechanism to protected software during run time, the system comprising:
computer memory;
an operating system having program code providing resources to support a debugger;
a processor for executing protected binary code of the protected software in accordance with a digital license, wherein the protected binary code generates at least one exception;
an exception handler that directs the computer system to execute an encrypted section of the protected software, the encrypted section comprising code specifying a corresponding license right, wherein upon a determination that the encrypted section is within a set of operating rights of the application, the encrypted section of code is removed from the protected binary code and stored in a table, the encrypted section of code having computer instructions necessary for complete execution of the protected binary code; and
a proxy execution engine that executes the encrypted section of code upon a determination to execute the encrypted section of code based upon a license evaluator verifying that the digital license grants the corresponding license right, the proxy engine comprising a debugger detection mechanism, wherein for each exception generated, the proxy execution engine checks for presence of a debugger using the debugger detection mechanism before returning from the exception.

10. The system of claim 9, wherein the debugger detection mechanism comprises a mechanism to examine debugger registers associated with a kernel and to determine if the debugger registers are being utilized.

11. The system of claim 9, wherein the debugger detection mechanism checks for the presence of a debugger by determining if a debugger communication port is active.

12. The system of claim 9, wherein the debugger detection mechanism checks for the presence of a debugger by performing one of the group comprising detecting interrupt requests for system resources and detecting external vectored exceptions.

13. The system of claim 9, wherein if a debugger is present, the proxy execution engine selects a response from one of the group including re-routing execution of the encrypted section of code, crashing the protected software, and intercepting an interrupt associated with the exception.

14. The system of claim 13, wherein if the selected response is re-routing execution of the encrypted section of code, then the proxy execution engine transfers control to a dummy function.

15. The system of claim 13, wherein if the selected response is intercepting an interrupt associated with the exception, then the intercepted interrupt is ignored by the debugger.

16. The system of claim 13, wherein if the selected response is crashing the protected software, the result of the crash is an unexpected end to a process performed by the protected software.

17. A computer-readable storage medium having computer-executable instructions stored thereon for proxy-execution of code to prevent reverse engineering of protected software when the instructions are executed by a processor, the instructions comprising:
instantiating the protected software, wherein the protected software comprises a protected binary code and an encrypted section of code specifying a corresponding license right, wherein upon a determination that the encrypted section of code is within a set of operating rights of the application, the encrypted section of code is removed from the protected binary code and stored in a table, the encrypted section of code having computer instructions necessary for execution of the protected binary, and wherein the removed encrypted section of code is replaced with one or more calls to execute relevant portions of the computer instructions of the encrypted section of code using a proxy execution engine;

executing the protected binary code in accordance with a digital license until a call to the proxy execution engine generates an exception and halts execution of the protected software;

determining to execute the encrypted section of code, using the proxy execution engine, when a license evaluator verifies that the digital license grants the corresponding license right;

checking for the presence of a debugger before starting execution of the encrypted section of code; and upon failure to detect a debugger, executing a relevant portion of the encrypted section of the protected software before returning the exception and continuing execution of the protected binary code.

18. The computer-readable storage medium of claim 17, further comprising:

upon detecting a presence of a debugger, selecting a response to detection of the debugger from one of the group including re-routing execution of the encrypted section of code, crashing the protected software, and intercepting an interrupt associated with the exception, wherein operation of the debugger to reverse engineer the protected software is prevented.

19. The computer-readable storage medium of claim 18, wherein if the selected response is re-routing execution of the encrypted section of code, then the proxy execution engine transfers control to a dummy function.

20. The computer-readable storage medium of claim 18, wherein if the selected response is intercepting an interrupt associated with the exception, then the intercepted interrupt is ignored by the debugger.

* * * * *